United States Patent [19]
Purdes

[11] 3,754,987
[45] Aug. 28, 1973

[54] METHOD OF PRODUCING AREAS OF RELATIVELY HIGH ELECTRICAL RESISTIVITY IN DIELECTRIC SUBSTRATES

[75] Inventor: Andrew J. Purdes, Madison, Ill.

[73] Assignee: Texas Instruments Incorporated, Dallas, Tex.

[22] Filed: June 4, 1971

[21] Appl. No.: 150,201

Related U.S. Application Data

[63] Continuation-in-part of Ser. No. 788,019, Dec. 30, 1968, abandoned.

[52] U.S. Cl. .................. 117/212, 117/213, 117/215, 29/610, 29/620, 252/518, 252/519
[51] Int. Cl. ............................ B44d 1/18, B44d 1/20
[58] Field of Search .................... 117/212, 213, 215; 29/610, 620; 252/518, 519

[56] References Cited

UNITED STATES PATENTS

| | | | |
|---|---|---|---|
| 3,642,527 | 2/1972 | Purdes et al. | 117/212 |
| 3,441,517 | 4/1969 | Brauer et al. | 252/519 X |
| 3,296,359 | 1/1967 | Ramsey, Jr. et al. | 117/212 X |
| 3,362,851 | 1/1968 | Dunster | 117/212 |
| 3,415,679 | 12/1968 | Chuss | 117/212 |
| 3,450,581 | 6/1969 | Shortes | 117/212 X |

*Primary Examiner*—Alfred L. Leavitt
*Assistant Examiner*—M. F. Esposito
*Attorney*—Harold Levine, Edward J. Connors, Jr., John Haug and Gerald B. Epstein

[57] ABSTRACT

Areas of relatively high electrical resistivity in a dielectric substrate, such as doped barium titanate, may be produced by first forming a relatively porous substrate which may be handled without breaking, as by prefiring the substrate, masking selected portions of the substrate with a material such as a photoresist material which will vaporize during final firing of the substrate, contacting the substrate with a solution of a first reactant, immersing at least a portion of the substrate in a solution of a second reactant which will react with the first reactant to precipitate in situ in a portion of the substrate a transition metallic compound which is insoluble in the solutions and which is adapted to increase the electrical resistivity of the said portion of the substrate, and thereafter firing the sustrate at a temperature on the order of 1,300°– 1,450°C. to reduce the porosity of the substrate and to incorporate the insoluble compound into the lattice of selected portions of the substrate. The starting material may be a lanthanum doped barium titanate, for example, the solution of the first reactant may be an aqueous solution of a compound such as ammonium hydroxide, and the solution of the second reactant may be an aqueous solution of an iron compound such as ferric chloride which reacts with the ammonium hydroxide to precipitate in situ ferric hydroxide which, when fired, produces a high resistivity area.

28 Claims, No Drawings

METHOD OF PRODUCING AREAS OF RELATIVELY HIGH ELECTRICAL RESISTIVITY IN DIELECTRIC SUBSTRATES

This is a continuation-in-part of Ser. No. 788,019, filed Dec. 30, 1968 now abandoned.

This invention lies in the field of dielectric substrates and more particularly relates to improved methods of producing areas of relatively high resistivity in selected portions of a dielectric substrate.

As is well known, barium titanate substrates may be made semiconducting by the addition thereto of a few tenths of a molar percent, e.g., 0.1 – 0.4 molar percent, of a trivalent element such as lanthanum, samarium or cerium. The room temperature resistivity of the ceramic substrate doped in this manner and thereafter sintered or fired at a temperature of approximamately 1,300°–1,450°C. in air is approximately 50 ohm-cm. Upon raising the temperature of such doped ceramic substrates to their ferroelectric transition temperature (120°C.), the substrates exhibit a very sharp positive temperature coefficient (PTC) of resistivity. Through the formation of solid solutions of barium titanate-lead titanate ($BaTiO_3$ - $PbTiO_3$) and barium titanate-strontium titanate ($BaTiO_3$ - $SrTiO_3$), the temperature at which the PTC transition occurs may be raised or lowered.

For various device applications utilizing such ceramic substrates, electrical isolation may be required, resulting in insulation which may reduce the performance of the device. Also, if thermal coupling to other electrical components is desired, the required electrical insulation may produce an undesirable thermal impedance between ceramic and thermally coupled components. There has been a need, therefore, for a practical method for providing very thin insulating regions in ceramic substrates.

Among the objects of the invention, accordingly, may be mentioned the provision of an improved method of producing areas of relatively high electrical resistivity in selected portions of a dielectric substrate; the provision of such a method which effectively provides very thin insulating regions in dielectric substrates; the provision of passivating or electrically insulating selected portions of a doped barium titanate substrate; and the provision of such a method which may be readily and conveniently carried out and which permits a controlled amount of electrical insulation or increased electrical resistivity of dielectric substrates to be achieved. Other objects and features will be in part apparent and in part pointed out hereinafter.

The present invention is thus directed to the method of producing areas of relatively high electrical resistivity in selected portions of a dielectric substrate which comprises first providing a dielectric substrate which may be handled without breakage, contacting the substrate with a solution of a first reactant, contacting at least a portion of the substrate with a solution of a second reactant, one of the reactants containing a transition metallic compound, the second reactant reacts with the first reactant to precipitate in situ in a portion of the substrate a compound containing a transition metal which is insoluble in the aforesaid solutions and which is adapted to increase the electrical resistivity of the said portion of the substrate, and causing the substrate to incorporate the insoluble compound into the lattice of selected portions of the substrate and thereby increasing the electrical resistivity of the selected portions of the substrate.

In accordance with the invention, the method involves forming a relatively porous doped barium titanate substrate which may be handled without breakage, contacting the substrate with a solution of a first reactant, introducing into at least a portion of the substrate a solution of a second reactant, one of the reactants containing a transition metallic compound such as an iron, copper, manganese, vanadium, ruthenium and molybdenum compound, the second reactant reacts with the first reactant to precipitate in situ in a portion of the substrate a transition metallic compound which is insoluble in the two reactant solutions and which is adapted to passivate or increase the electrical resistivity of the said portion of the substrate, and thereafter firing the substrate to reduce its porosity and to incorporate the insoluble compound into the lattice of the substrate.

In the first step of the method of the invention, a doped substrate, such as a lanthanum doped barium titantate, is formed in the desired shape through the use of a pellet press. In the pressing operation, the doped barium titanate is preferably pressed to 50 percent of theoretical density. The green pressed sample is then prefired at a temperature within the range 1,000° – 1,300°C. for approximately one hour or less to produce a relatively porous substrate which may be readily handled without breakage and which does not soften in aqueous media. The pore volume of the substrate may be conveniently determined by saturating the sample with water and measuring the resultant increase in weight. A ratio of substrate weight to the weight of the water absorbed of about 5:1, for example, has been found satisfactory to work with in carrying out the practice of the invention.

The selected surface areas of the prefired substrate where electrical insulation is not desired are masked through the use of tape, plastic coating, photosensitive resist compositions or other suitable materials known to those in the art. Among suitable photosensitive resist compositions which may be utilized in the practice of the invention may be mentioned those marketed by Eastman Kodak Company under the trade designations KPR (KODAK Photo Resist), KMER (KODAK Metal-Etch Resist) and KTFR (KODAK Thin-Film Resist). It is highly preferable that the masking material be one which is adapted to be completely vaporized or burnt off during the final firing step described hereinafter.

The masked substrate sample is then immersed into a solution of a first reactant, ammonium hydroxide for example, until its pores become saturated. This generally required one-half hour. After saturation with the ammonium hydroxide, the substrate is then immersed in a weak solution of a second reactant, ferric chloride ($FeCl_3.6H_2O$) for example, which reacts with the first reactant to precipitate in situ an insoluble iron compound, ferric hydroxide for example. Upon immersion in the solution of the second reactant, the ferric ions therefrom diffuse into the pores of the substrate through the ammonium hydroxide solution contained in the substrate and are precipitated as ferric hydroxide onto the walls of the pores. The depth of penetration of the ferric ions may be readily controlled by controlling the concentrations of the first and second reactant solutions, the temperature of the solutions and the time the substrate is contacted with the second reactant solution ontaining the ferric ions. In order to achieve the desired passivating effect on the substrate, a minimum amount of the insoluble ferric compound on the order of at least 0.2 percent should be introduced into the substrate.

The resulting substrated with the insoluble ferric compound precipitated therein is fired in air at a temperature of approximately 1,300° – 1,450°C. for approximately one hour to effect sintering and to incorporate the insoluble ferric compound into the lattice of the substrate. The final firing step also vaporizes the masking material and ammonium compound (ammonium chloride) formed during precipitation of ferric hydroxide, and further reduces the porosity of the substrate to approximately 10 percent.

In lieu of ammonium hydroxide, solutions of other water-soluble ammonium compounds such as ammonium phosphate, aliphatic and aromatic basic organic amines such as triethylamine and aniline which will react with a water-soluble transition metallic compound to form an insoluble transition metallic compound, may be used in the practice of the invention. Similarly, various water-soluble transition metallic compounds may be used as the source of the transition metal ions. For instance, iron acetate, iron formate and iron nitrate may be used in place of ferric chloride, when iron is the transition metal employed, as the source of iron ions required to form an insoluble iron compound in situ as described.

Although the use of solutions of ammonium compounds as the solution of the first reactant is generally preferred since the remaining ammonium compound may be vaporized during the final firing step, solutions of compounds such as sodium hydroxide, potassium hydroxide and the like may be employed as the first reactant solution. However, the use of such compounds is less preferable since it is necessary to remove the remaining sodium or potassium compound from the substrate, as by leaching, as by immersion in running, distilled or deionized water for 4 to 5 hours prior to final firing.

Alternatively to the procedure described above, the prefired substrate may first be saturated with water and then introduced into a solution of a soluble transition metallic compound such as a ferric compound for a time sufficient to give the desired concentration of ferric ions in the substrate. The substrate may then be placed in a solution of a reactant, such as ammonium hydroxide, which reacts with the ferric ions in the substrate to precipitate an insoluble ferric compound such as ferric hydroxide in situ.

Further, solvents other than water may be used to provide the solutions of the first and second reactants which react to precipitate an insoluble transition metallic compound in situ in the substrate. In order to be useful, such solvents must be solvents for the reactants but not for the precipitated transition metallic compound. The other reaction product formed in precipitation of the insoluble transition metallic compound should either be vaporizable during final firing or be capable of being leached out prior thereto.

The method of the invention thus permits the obtainment of a maximum amount of passivation or electrical insulation of the substrate with a minimal thickness of the layer of insoluble transition metallic compound. For example, marked increases in the electrical resistivity of the doped substrate may be obtained with a depth of penetration of only about 2 to 3 mils. For example, the small amount of insoluble iron compound mentioned above introduced into the substrate is sufficient to raise the room temperature resistivity of doped barium titantate from 50 ohm-cm to about $10^{10}$ ohm-cm.

It will be understood that the invention may be carried out using various dielectric substrates. In place of barium titanate, other members of the titanate family such as barium strontium titanate ($BaSrTiO_3$) or barium lead titanate ($BaPbTiO_3$) may be employed. Also, the invention may be carried on such substrates doped with various dopants known to the art to generate semiconducting properties including dopants such as lanthanum, cerium, samarium, gadolinium and other trivalent rare earth elements which are introduced into the substrates through the use of soluble compounds there of in a manner known to the art.

The method of the invention may be carried out to increase the electrical resistivity or to passivate the entire major surfaces of substrates or only of selected small areas of the substrates. However, where the ratio of the thickness of the substrate to the thickness of the passivated layer applied through the invention is small (e.g., on the order of 2:1), there is a tendency for the substrate to undergo splitting and shrinkage during final firing where the applied layer covers the entire major surfaces of the substrate. This difficulty is not encountered where the ratio of the respective thicknesses is high (e.g., on the order of 10:1 or more) or where the applied layer covers selected small areas or portions of the substrate and the remaining areas are masked.

The following examples further illustrate the invention.

EXAMPLE 1

A green pressed sample of barium titanate doped with 0.2 molar percent lanthanum was prefired at a temperature of 1,200°C. for one hour in air. The desired mask was applied to the sample by means of a photosensitive resist composition and the sample was then immersed in a solution prepared by adding one ml. of concentrated ammonium hydroxide to 49.7 ml. of water.

After allowing the sample to become saturated with the ammonium hydroxide (one-half hour in solution), it was rinsed in distilled water. The sample was then placed in a solution prepared by dissolving 1.17 g. of ferric chloride ($FeCl_3.6H_2O$ in 100 ml. of water. After immersion for one hour in the ferric chloride solution, the sample was rinsed and fired at a temperature of 1,450°C. in air for one hour.

The resulting fired sample had a high resistivity layer approximately 5 mils in thickness which could be visually observed, being light green in color as compared with the dark blue interior of the sample.

EXAMPLE 2

A wafer or barium titanate doped with 0.3 percent lanthanum was pressed to 50 percent theoretical density and prefired at a temperature of 1,200°C. for approximately one hour. The sample was then immersed in a solution consisting of one ml. of concentrated ammonium hydroxide per 25.0 ml. of water for one-half hour. After removing the sample for this solution, it was placed in a solution consisting of 1.17 g. of ferric chloride ($FeCl_3.6H_2O$) per 100 ml. of water for one minute. The high concentration of hydroxyl ions $(OH)^-$ in the wafer insured that the ferric ions $(Fe^{+++})$ could diffuse only a very short distance into the sample before being precipitated as ferric hydroxide. The depth of penetration was approximately 2 to 3 mils.

After firing the resulting doped sample in air at a temperature of approximately 1,450°C. for one hour, the interior and masked surface areas were semiconducting with a resistivity of about 50 ohm-cm. The areas of the surface which were not masked were found to be insulating with resistances greater than $10^8$ ohms per square.

EXAMPLE 3

A wafer or barium titanate doped with 0.3 percent lanthanum was pressed to 50 percent theoretical density and prefired at a temperature 1,200°C. for approximately one hour. The sample was then immersed in a solution consisting of one ml. of concentrated ammonium hydroxide per 25.0 ml. of water for one-half hour. After removing the sample from this solution, it was placed in a solution consisting of 0.87 g. of manganese dichloride $(MnCl_2.4H_2O)$ per 100 ml. of water for one minute. The high concentration of hydroxyl ions $(OH)^-$ in the wafer insured that the manganous ions $(Mn^{++})$ could diffuse only a very short distance into the sample before being precipitated as manganous hydroxide. The depth of penetration was approximately 2 to 3 mils.

EXAMPLE 4

A wafer or barium titanate doped with 0.3 percent lanthanum was pressed to 50 percent theoretical density and prefired at a temperature of 1200°C. for approximately one hour. The sample was then immersed in a solution consisting of 10 ml. of triethylamine in 25 ml. of water for one-half hour. After removing the sample from this solution, it was placed in a solution containing 1.20 grams of cupric nitrate $Cu(NO_3).6H_2O$ per 100 ml. of water for one minute. The high concentration of hydroxide ions $(OH)^-$ in the wafer insured that the cupric ions $(Cu^{++})$ diffuse only a very short distance into the sample before being precipitated as cupric hydroxide. The depth of penetration was approximately 2 – 3 mils.

EXAMPLE 5

A wafer of barium titanate doped with 0.3 percent yttrium was pressed to 50 percent theoretical density and prefired at a temperature of 1,150°C. for approximately one hour. The sample was then immersed in a solution consisting of 10 ml. aniline per 50 ml. of water for one-half hour. After removing the sample from this solution, it was placed in a solution consisting of 0.63 grams of vanadium sulfate $(VSO_4.7H_2O)$ per 100 ml. of water for two minutes. The high concentration of the organic base in the wafer insured that the vanadium ion $(V^{++})$ could diffuse only a very short distance into the sample before being precipitated. The depth of penetration was approximately 5 mils.

In view of the above, it will be seen that the several objects of the invention are achieved and other advantageous results attained.

As various changes could be made in the above methods without departing from the scope of the invention, it is intended that all matter contained in the above description shall be interpreted as illustrative and not in a limiting sense.

I claim:

1. The method of producing areas of relatively high electrical resistivity in selected portions of a doped titantate substrate comprising:
  providing a doped titanate substrate having a theoretical density of less than 90 percent and prefired at a temperature 1,000° – 1,300°C. so that it may be handled without breakage;
  masking selected portions of the substrate;
  saturating the substrate with a solution of a first reactant;
  placing at least a portion of the substrate into a solution of a second reactant reactive with the first reactant, at least one of said first and second reactants comprising a soluble compound containing a transition metal which reacts with the other of said first and second reactant to produce a transition metallic compound insoluble in said solutions and to precipitate in situ in a portion of the substrate the transition metallic compound which is adapted to increase the electrical resistivity of said portion of the substrate; and
  firing the substrate at a temperature between 1,300° – 1,450°C. for less than one hour to incorporate said insoluble transition metallic compound into the lattice of selected portions of the substrate and thereby increasing the electrical resistivity of said selected portions of the substrate.

2. The method of claim 1 wherein said transition metal is iron.

3. The method of claim 1 wherein said transition metal is manganese.

4. The method of claim 1 wherein said transition metal is copper.

5. The method of claim 1 wherein said transition metal is vanadium.

6. The method of claim 1 wherein said transition metal is ruthenium.

7. The method of claim 1 wherein said transition metal is molybdenum.

8. The method of claim 1 wherein the masked portions of the substrate are masked with a material which is adapted to be vaporized and said material is vaporized from the substrate during firing thereof.

9. The method of producing areas of relatively high electrical resistivity in selected portions of a doped barium titanate substrate comprising:
  forming a relatively porous doped barium titanate substrate by pressing the material to a theoretical density of less than 90 percent and prefiring the substrate at a temperature between approximately 1,000° – 1,300°C. so that it may be handled without breakage;
  masking selected portions of the substrate;
  contacting the substrate with a solution of a first reactant;
  saturating into at least a portion of the substrate a solution of a second reactant reactive with the first reactant comprising a soluble compound containing a transition metal which reacts with said first reactant to produce a transition metallic compound insoluble in said solutions and to precipitate in situ in a portion of the substrate the transition metallic compound which is adapted to increase the electrical resistivity of said portion of the substrate; and thereafter firing the substrate at a temperature between approximately 1,300° – 1,450°C. for less than one hour to reduce its porosity and to incorporate said insoluble transition metallic compound into the lattice of the substrate.

10. The method of claim 9 wherein said transition metal is selected from the group consisting of iron, manganese, copper, vanadium, ruthenium and molybdenum.

11. The method of claim 9 wherein said transition metal is selected from the group consisting of iron, manganese, copper and vanadium.

12. The method of producing areas of relatively high electrical resistivity in selected portions of a doped titanate substrate comprising:

providing a doped titanate substrate having a theoretical density of less than 90 percent and prefired at a temperature between approximately 1,100° – 1,300°C. so that it may be handled without breakage;

masking selected portions of the substrate;

saturating the substrate with a solution of a first reactant selected from the group consisting of soluble ammonium compounds, sodium hydroxide and potassium hydroxide;

placing at least a portion of the substrate into a solution of a second reactant reactive with the first reactant comprising a soluble ferric compound which reacts with said first reactant to produce a ferric compound insoluble in said solutions and to precipitate in situ in a portion of the substrate the ferric compound which is adapted to increase the electrical resistivity of said portion of the substrate; and firing the substrate at a temperature between approximately 1,400° – 1,450°C. for approximately one hour to incorporate said insoluble ferric compound into the lattice of selected portions of the substrate and thereby increasing the electrical resistivity of said selected portions of the substrate.

13. The method of claim 12 wherein the masked portions of the substrate are masked with a material which is adapted to be vaporized, and said material is vaporized from the substrate during firing thereof.

14. The method of producing areas of relatively high electrical resistivity in selected portions of a doped barium titante substrate comprising:

forming a relatively porous doped barium titanate substrate by pressing the material to a theoretical density of less than 90 percent and prefiring the substrate at a temperature between approximately 1,000° – 1,300°C. so that it may be handled without breakage;

masking selected portions of the substrate;

saturating the substrate with a solution of a first reactant selected from the group consisting of soluble ammonium compounds, sodium hydroxide and potassium hydroxide;

placing into at least a portion of the substrate a solution of a second reactant reactive with the first reactant comprising a soluble ferric compound which reacts with said first reactant to produce a ferric compound insoluble in said solutions and to precipitate in situ in a portion of the substrate the ferric compound which is adapted to increase the electrical resistivity of said portion of the substrate; and thereafter firing the substrate at a temperature between approximately 1,400°C – 1,450°C. for approximately one hour to reduce its porosity and to incorporate said insoluble ferric compound into the lattice of the substrate.

15. The method of claim 14 wherein the masked portions of the substrate are masked with a material which is adapted to be vaporized, and said material is vaporized from the substrate during said firing.

16. The method of claim 14 wherein the solution of said first reactant is an aqueous solution of a water soluble ammonium compound.

17. The method of claim 16 wherein the solution of said second reactant is an aqueous solution of a ferric compound which reacts with said ammonium compound to form a water insoluble ferric compound.

18. The method of producing areas of relatively high electrical resisitivity in selected portions of a doped barium titanate substrate comprising:

forming a relatively porous doped barium titanate substrate by pressing the material to a theoretical density of less than 90 percent and prefiring the substrate at a temperature between approximately 1,100° – 1,300°C. so that it may be handled without breakage;

masking selected portions of said substrate with a material which is adapted to be vaporized;

saturating the substrate with a solution of a first reactant selected from the group consisting of soluble ammonium compounds, sodium hydroxide and potassium hydroxide;

immersing at least a portion of the substrate in a solution of a second reactant reactive with the first reactant comprising a soluble ferric compound which reacts with said first reactant to produce a ferric compound insoluble in said solutions and to precipitate in situ in a portion of the substrate the ferric compound which is adapted to increase the electrical resistivity of said portion of the substrate; and thereafter firing the substrate at a temperature between approximately 1,400° – 1,450°C. for approximately 1 hour to reduce its porosity and to incorporate said insoluble ferric compound into the lattice of the substrate.

19. The method of claim 18 wherein the solution of said first reactant is an aqueous solution of ammonium hydroxide.

20. The method of claim 19 wherein a relatively porous doped barium titanate substrate is formed by pressing doped barium titanate into a substrate of the desired shape under a pressure sufficient to reduce the porosity thereof no more than approximately 50 percent.

21. The method of claim 1 wherein the substrate is composed of barium titanate doped with lanthanum.

22. The method of claim 9 wherein the transition metal is manganese, the solution of said first reactant is an aqueous solution of ammonium hydroxide.

23. The method of claim 22 wherein the solution of said second reactant is an aqueous solution of manganese dichloride and the insoluble manganese compound is manganous hydroxide.

24. The method of claim 9 wherein the transition metal is copper, the solution of said first reactant is an aqueous solution of triethylamine.

25. The method of claim 24 wherein the solution of said second reactant is an aqueous solution of cupric nitrate and the insoluble cupric compound is cupric hydroxide.

26. The method of claim 9 wherein the substrate is doped with yttrium and the transition metal is vanadium, the solution of said first reactant is an aqueous solution of aniline.

27. The method of claim 26 wherein the solution of said second reactant is an aqueous solution of vanadium sulfate.

28. The method of producing areas of relatively high electrical resistivity in selected portions of a doped titanate substrate comprising:

forming a relatively porous doped titanate substrate by pressing the material to a theoretical density of less than 90 percent and prefiring the substrate at a temperature between approximately 1,000° – 1,300°C. so that it may be handled without breakage;

masking selected portions of said substrate with a material which is adapted to be vaporized;

saturating the substrate with a solution of a first reactant;

immersing at least a portion of the substrate in a solution of a second reactant reactive with the first reactant, at least one of said first and second reactants comprising a soluble compound containing a transition metal which reacts with the other of said first and second reactant to produce a transition metallic compound insoluble in said solutions and to precipitate in situ in a portion of the substrate the transition metallic compound which is adapted to increase the electrical resistivity of said portion of the substrate; and thereafter firing the substrate to reduce its porosity and to incorporate said insoluble ferric compound into the lattice of the substrate.

* * * * *